Oct. 2, 1945.     T. J. SETERA     2,385,948
SLIDE RULE
Filed April 10, 1941
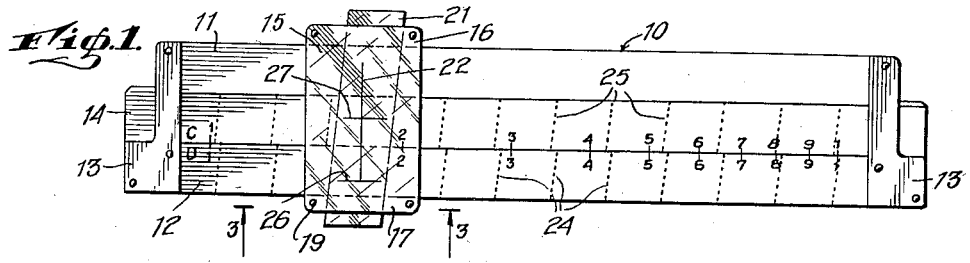
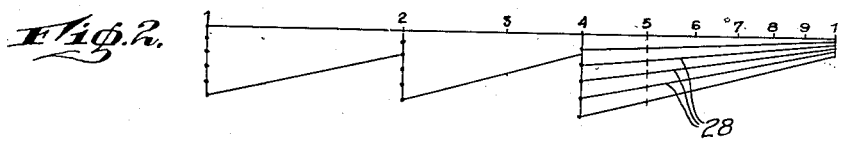
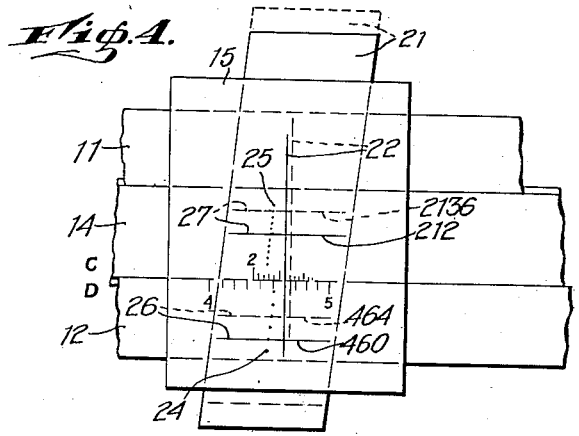
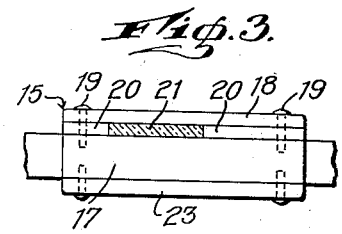
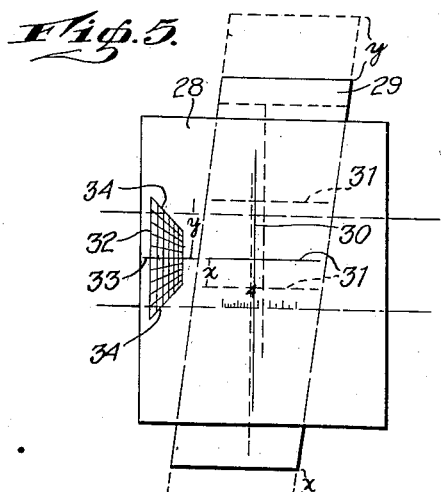
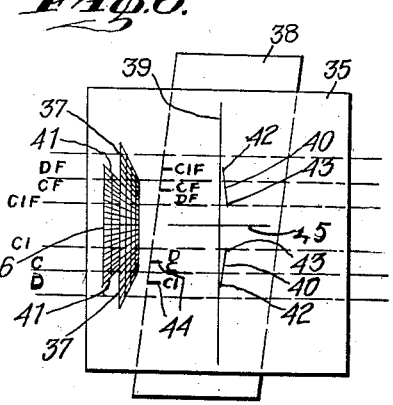
INVENTOR
THEODORE J. SETERA
BY
ATTORNEY Patented Oct. 2, 1945

2,385,948

UNITED STATES PATENT OFFICE 2,385,948

SLIDE RULE

Theodore J. Setera, Maspeth, Long Island, N. Y., assignor of one-half to Jacob Gillman, Jamaica, N. Y.

Application April 10, 1941, Serial No. 387,791

13 Claims. (Cl. 235—70)

This invention relates to computing devices commonly known as slide rules, and particularly to a device of the class described employing fixed and movable scales and a hair-line indicator movable relatively to said scales; and the object of the invention is to provide means involving a hair-line section in the indicator of a device of the class described movable diagonally with respect to the path of relative movement of said scales to facilitate greater accuracy in the setting and reading thereof; a further object being to provide scale markings on said device and registering with a transverse indicating means on said hair-line section to translate predetermined movement of said hair-line section into accurate fractional parts of various spaced markings of said fixed and movable scales; a further object being to provide an indicator unit having a movable hair-line section and scale markings arranged directly on said unit cooperating with said hair-line section; a still further object being to provide means in said indicator unit for accurately determining the proper scale markings in different positions of the unit with respect to the fixed and movable scales of said device; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by reference characters in each of the views; and in which:

Fig. 1 is a diagrammatic plan view of a slide rule indicating one form of my invention associated therewith.

Fig. 2 is a graphic diagram of the scale markings cooperating with the movable hair-line section as shown in Fig. 1, and indicating the variation in spacing of such markings at different points longitudinally of the slide rule.

Fig. 3 is a view substantially on the line 3—3 of Fig. 1.

Fig. 4 is an enlarged diagrammatic view of the indicator and a portion of the slide rule as shown in Fig. 1, illustrating the use thereof.

Fig. 5 is a view similar to the indicator of Fig. 4 showing a modification of the indicator; and, Fig. 6 is a view similar to Fig. 5 showing a further modification.

In the use of a slide rule of the conventional type, the degree of accuracy in setting and reading the device is limited by the particular spacing of the graduations or markings longitudinally of the fixed and movable scales. As used hereinafter in the specification and claims the expression "small subdivision" is intended to mean the space between any two successive graduations or markings of said scales. A hair-line indicator can be adjusted quite accurately to a position in superimposed relation to one of the lines or marks on a scale, but when it comes to setting the hair-line to a fractional distance between two such marks, there is great chance for inaccuracy and error in judgment. It is the purpose of the present invention to provide means for accurately adjusting the hair-line of the indicator to predetermined fractional portions of the distance between adjacent markings and to enable reasonably accurate judging of still further subdivisions thereof. In other words, by means of the present invention, it is possible to extend the accuracy of a given slide rule to one or more additional decimal places, thereby materially adding to the usefulness of the slide rule.

The invention consists in providing a hair-line bearing section diagonally arranged in the indicator of the slide rule for movement angularly to the longitudinal axis of the slide rule. In other words, the movement of the hair-line section in the indicator translates to the hair-line a reduced movement longitudinally of the slide rule depending on the angularity of said section. Thus, knowing the distance between any two markings on a scale of the slide rule, the vertical movement of the hair-line section corresponding to this distance can be determined. This extent of movement, being greatly magnified with respect to the spacing of the scale markings, may accurately be divided into fractional parts, and subsequent movement of the hair-line section with respect to these fractional parts will produce an accurate proportional movement of the hair-line longitudinally of the slide rule.

Since successive graduations on the various scales of a slide rule are variably spaced according to a logarithmic pattern, it will be apparent that the scale markings cooperating with the movable hair-line section to measure the transverse movement thereof will vary correspondingly. Likewise, the scale markings which cooperate with the hair-line section may be incorporated with the slide rule in different ways as more fully hereinafter set forth.

For purposes of illustration I have shown in Fig. 1 of the drawing a diagrammatic representation of a slide rule 10 comprising a frame having fixed rails 11 and 12 joined at the ends thereof by brackets 13, and a movable rail 14 arranged for sliding engagement with the rails 11 and 12. The surfaces of the rails 11, 12, and 14 are provided with different logarithmic scales and scale markings depending upon the use for which the slide rule is intended. For purposes of illustration a single fixed scale and a single movable scale have been shown in the drawing, these being the D scale and the C scale respectively, which are more or less standard scales for simple computations and are therefore found on most slide rules. In the drawing the primary subdivisions of the C and D scales have been diagrammatically indicated. It will be understood, of course, that each of these subdivisions may be further divided and subdivided according to the size of the slide rule and the degree of accuracy desired therein.

At 15 there is shown a cursor herein referred to as an indicator in that it is the common trade term used for such devices. This indicator is slidable longitudinally of the rails 11, 12, and 14. The indicator is formed from frame parts 16, 17, note Figs. 1 and 3, having an outer transparent member 18 secured thereto in any suitable manner, as for example by the screws 19. Between the member 18 and the frame parts 16 and 17 is another transparent member 20 having a diagonal portion thereof removed to receive a slidable section 21 having a hair-line 22 arranged therein in a manner to be disposed perpendicular to the longitudinal axis of the slide rule. As shown in the drawing, the member 20 actually comprises similar spaced members. It will be apparent, however, that it is within the scope of the invention to fashion the member 20 from a single part grooved or channeled to receive the section 21. In the showing of Fig. 3, the indicator has been shown as provided with a lower transparent member 23. It will be understood that such a construction is adapted for use on double-face slide rules, whereas on a single-face slide rule, such rear transparent member will be dispensed with. It will further be understood that if desired in a double-face slide rule, an additional movable section, similar to the section 21, may be provided. For present purposes, however, description will be limited to the simplified showing in the drawing.

At intervals longitudinally of the rails 12 and 14 and associated with the D and C scales respectively, are spaced scales or groups of markings 24, 25, which are preferably arranged at an angle equal to the angularity of the side of the hair-line section 21. These groups are spaced at intervals longitudinally of the slide rule sufficiently close so that at least one group on each of the rails will at all times be in alinement with, or closely adjacent, the section 21. Thus it will at all times be possible to move suitable indicator hair-lines or other markings 26, 27 on the section 21 accurately with respect to the markings of the proper diagonally arranged group.

In Fig. 2 of the drawing, the spacing of the dots in the scales 24—25 have been graphically indicated for all points along the slide rule. The smaller subdivisions in the C and D scales are duplicated as to size in the sections between 1 and 2, 2 and 4, and 5 and 10, on each scale. In the small section between 4 and 5 the successive graduations or markings are more widely spaced than elsewhere on the scale. In the graphic showing of Fig. 2 there has been diagrammatically indicated the degree of vertical movement of the hair-line section 21 which corresponds with the size of the small subdivisions, and the section between 4 and 10 has been divided into fractional parts by the lines 28. In the various groups of markings 24 and 25, the spacing of the markings in the respective groups will correspond to the spacing of the registering portions of the lines 28, or such other fractional divisional lines which might be employed.

It will, of course, be apparent that when the markings are arranged in spaced groups as at 24, 25, readings between the groups of markings will be slightly less accurate than readings made when the hair-line 22 is registering with a point on the C or D scale which is directly in alinement with one of these groups. The groups 24, 25, will, however, be arranged sufficiently close so that the slight inaccuracy produced will be insignificant as compared with the increased accuracy produced in the use of the adjustable hair-line section 21.

In Fig. 4 there is an enlarged illustration of a small section of the construction shown in Fig. 1. The indicator 15 and section 21 have been shown in a hypothetical position of setting with respect to the C—D scales; and the dotted line showing of the section 21 indicates the manner of accurately adjusting and reading fractional settings of the hair-line 22 between successive markings on the C and D scales. It will be noted that the transverse hair-lines 26 and 27 are registering with the markings 24 and 25 respectively. In the full line position of the section 21 the reading on the D scale would be 460 while the reading on the C scale would be 212. When the section 21 is moved to the dotted line position, the hair-line 26 has been moved two units on the scale 24, and since five units on the scale 24 are equal to one unit on the D scale, the reading on the D scale has been increased by 2/5 of a unit, or in other words, to 464.

Turning now to the C scale, it will be noted that in the full line position of the section 21, the hair-line 22 would give the accurate reading 212. In the dotted line position, however, the hair-line 27 is moved four units along the scale 25. The markings in the scale 25 are so spaced that five units along this scale will be the equivalent of movement of the hair-line 22 longitudinally of the slide rule from one mark on the C scale to the next successive mark. On the C scale, small subdivisions with which the hair-line 22 is registering, each represent two units so that 4/5 of this amount would be 1.6 units. Thus, disregarding the decimal point, the accurate reading on the C scale according to the dotted line position of the hair-line 22 would be 2136.

It will be apparent in view of the foregoing that with the improved slide rule construction, it is extremely easy to obtain accurate settings of the hair-line 22 at points intermediate successive graduations on the scales. In obtaining accurate readings, as for example in accurately reading an answer, the process is simply reversed. In other words, suppose an answer was to be found in the dotted line position of the hair-line 22 on the D scale, the operator immediately knows that the answer is slightly over 46. Thus, by noting the dotted line position of the hair-line 26 and moving the section 21 downwardly until the hair-line 22 is exactly over the 46 mark of the D scale, the number of units which the hair-line has moved along the scale 24 will determine accurately the fractional reading in excess of 46, which in the representation would be two units, making the answer 464.

In Figs. 5 and 6 of the drawing, there is shown a modified adaptation of the invention wherein the markings for measuring the vertical movement of the hair-line section are arranged on the indicator unit and movable longitudinally of the slide rule together therewith, thus dispensing with the markings 24 and 25 on the fixed and movable rails of the slide rule. In Fig. 5 the indicator unit 28 is provided with a slidable section 29, similar to the section 21, having a vertical hair-line 30 and a transverse hair-line 31 thereon. At one side of the section 29 is a scale, chart or diagram 32 on which to measure vertical movement of the hair-line 31. It will be apparent that the lower half of the diagram 32 is similar to the showing in Fig. 2 and particularly the portion thereof between 4 and 10 on the scale.

The diagram 32 is constructed to meet the range of conditions which will be met in a given slide rule. In Fig. 5 of the drawing a brief section of the C scale has been shown indicating the smallest subdivisions thereof; and we shall assume for purposes of illustration that the subdivisions to the left of the numeral 4 on the C scale represent the smallest subdivisions to be found anywhere on the slide rule, and the subdivisions to the right of the numeral 4 to be the largest single subdivisions. In translating longitudinal spacing of successive graduations forming these subdivisions to vertical movement of the section 29, it will be noted that the smaller units are equal to a vertical movement as indicated at X, whereas the large units are equal to a much larger vertical movement as indicated at Y. The distances X and Y therefore form the end vertical lines of the diagram 32 as will be apparent, it being understood that the diagram is repeated above and below the center line 33 thereof. The lines 34 joining the end lines of the diagram 32 represent the vertical movement of the section 29 which corresponds with the small subdivisions of the slide rule scale at any and all points between the largest and smallest of said subdivisions.

A plurality of vertical lines are provided in the diagram 32. The spacing between these vertical lines corresponds with the size of the small subdivisions of the slide rule scales at representative points along said scales. For example, the spacing between the vertical line at the left hand end of the diagram 32, as shown in Fig. 5, and the next vertical line may be equal to a small subdivision of the slide rule scale at a point midway between the numerals 4 and 5 of said scale. The space between successive vertical lines of the diagram 32 will then be equal to small subdivisions of the slide rule scale at points between the numerals 5—6, 6—7, 7—8, 8—9, and the space between the last two vertical lines at the right hand end of the diagram 32 will be equal to a small subdivision of the slide rule scale, at a point between the numerals 9 and 10. Between the lines 34 and 33, the diagram 32 may be subdivided in any desired manner, and for purposes of illustration the space between these lines has been divided into five parts.

In using the device shown in Fig. 5 to obtain a setting or reading, one must decide on the proper vertical line of the diagram 32 to use as a scale. This is done by visually comparing a particular subdivision of the slide rule scale with the spacing between the vertical lines of the diagram 32 and determining which of the latter spacing corresponds most closely with the said subdivision. Then if the subdivision is larger than the spacing that has been selected, the vertical line to the left of said spacing should be employed, and if smaller, the line to the right of said spacing should be employed for measuring vertical movement of the section 29. It will be noted that the diagram 32 is sufficiently close to the area on the section 29 in which readings are to be taken so that the selection of the proper scale will be reasonably accurate. Having decided on the proper vertical line or scale of the diagram 32 to employ, the operation of the device will proceed in precisely the same manner as previously described in connection with Fig. 4.

In Fig. 6 of the drawing there is shown a slight modification of the construction as shown in Fig. 5. Here the indicator unit 35 has been shown diagrammatically associated with a more complex slide rule having a plurality of scales thereon. Briefly, the C and D scales are the normal computing scales, the DF and CF scales are special scales having end indexes at 3.1416 (or pi); whereas the CI and CIF scales are inverted C and D or CF and DF scales respectively. It will be understood of course that the particular scales indicated here are merely representative of numerous and varied scales which are employed in more complex slide rules. On the indicator unit 35, a scale diagram 36 has been shown which is basically similar to the diagram 32. The wide portion of the diagram 36 (the left hand portion, as shown in Fig. 6) has been provided with additional subdivisions as will be apparent to facilitate greater accuracy in the reading thereof; while the narrow end of the diagram (the right hand end, as shown in Fig. 6) is provided with upper and lower extensions 37 which serve to extend the range of the scales at that portion of the diagram. It will be understood in this connection that the particular manner of arranging the lines and graduations in the diagram 36 may be varied in any desired manner to facilitate easy and accurate reading thereof. For example, different colors may be employed in the successive vertical lines of the diagram and individual transverse markings may be employed on these lines in place of the angular division lines which extend the full width of the diagram.

The hair-line section 38 is provided with the normal hair-line 39 and has been shown in the drawing in a central or neutral position. In spaced relation on the section 38 and adjacent the hair-line 39 are short gage lines 40 which may be arranged on either side of the line 39. The ends of each gage line 40 are spaced along the line 39 a distance equal to the vertical spacing of ends of the diagonal line 41 of the diagram 36 the diagram 36 and diagonal line 41 thereof are determined and laid out in the same way as the diagram 32 and corresponding line 34 previously described. The lines 40 are spaced throughout the length thereof at a graduated distance from the hair-line 39. The end 42 of each line 40 is spaced from the line 39 a distance equal to the closest spacing of successive graduations on the various scales of the slide rule. The ends 43 are spaced from the line 39 a distance equal to the wide spacing of successive graduations of the slide rule scale, while between the ends 42—43, the spacing of the line 40 from the line 39 will represent all intermediate small subdivisions of the slide rule scale.

It will be apparent that there is a direct relation between the gage lines 40 and the diagram 36, and this relation is made operative by means of index markings 44 along one edge of the section 38 and corresponding with the various scales of the slide rule. To illustrate the use of the marks 44: If the section 38 is moved to aline the end 43 of the lower gage line 40 with the C or D scale of the slide rule, the mark 44, which is identified as the C—D index, will be in alinement with the lower extremity of the lower line 41 on the diagram 36; and conversely, when the end 42 of the gage line 40 is moved into registering position with the C or D scale, the C—D marking 44 will be in alinement with the upper extremity of the lower line 41. In other words, it will be apparent that by setting the section 38 so that the spacing of the gage line 40 and the hair-line 39 corresponds to any given subdivision on the C or D scale, the point on the line 41, which is in transverse alinement with the C—D mark 44, will indicate the particular section or vertical line in the diagram 36, which should be employed in measuring the vertical movement of the horizontal hair-line 45 and thereby making the fractional or vernier adjustment of the hair-line 39.

The device as shown in Fig. 6 of the drawing functions basically in the same manner as previously described with the additional feature that means is provided for accurately determining the particular graduation in the diagram 36 which should be employed in regulating the movement of the section 38.

It will be understood from the present disclosure that generally speaking the invention relates to the provision of a means for providing a fine and measured adjustment of an indicator element which is movable with respect to a scale; and the invention is by no means limited to any particular type or kind of scale involving the parts such as specifically shown and described. As has been illustrated the fine adjustment of the hair-line or other indicator may be measured directly on the indicator or by registration with markings formed directly on the scale; and in either case the particular form and arrangement of the markings may of course be varied. This will especially be the case in the use of the invention on different types and kinds of instruments.

Having fully described my invention, what I claim as new and desire to secure by Letters Patent, is:

1. In a computing instrument having fixed and movable scales, an indicator mounted on and movable relatively to said scales, said indicator including a member mounted for diagonal movement with respect to the path of movement of the indicator on the scales, said member having a marking movable longitudinally of the scales in the diagonal movement of said member, other markings on said instrument arranged transversely of the scales representing sub-divisions of adjacent scale markings, and said member having another mark movable transversely of the scales and with respect to the last named markings in indicating sub-divisions between predetermined successive scale marks.

2. In a computing instrument having fixed and movable scales, an indicator movable relatively to said scales, said indicator including a member mounted for diagonal movement with respect to the path of movement of the indicator on the scales, said member having a marking movable longitudinally of the scales in the diagonal movement of said member, other markings on said instrument arranged transversely of the scales representing sub-divisions of adjacent scale markings, said member having another mark movable transversely of the scales and with respect to the last named markings in indicating sub-divisions between predetermined successive scale marks, the markings on said member both comprising hair lines, and the transversely arranged markings being disposed in groups spaced longitudinally of said scales.

3. In a computing instrument having fixed and movable scales, an indicator mounted on and movable relatively to said scales, said indicator including a member mounted for diagonal movement with respect to the path of movement of the indicator on the scales, said member having a marking movable longitudinally of the scales in the diagonal movement of said member, other markings on said instrument arranged transversely of the scales representing sub-divisions of adjacent scale markings, said member having another mark movable transversely of the scales and with respect to the last named markings in indicating sub-divisions between predetermined successive scale marks, the markings on said member both comprising hair lines, and said transversely arranged markings being arranged on said indicator adjacent one edge of said member.

4. In slide rules of the character described, an indicator unit mounted on and movable longitudinally of the rule, a member mounted in said unit for movement transversely thereof diagonally with respect to the path of movement of the unit on the rule, and said member having a hair-line mark arranged at right angles to the path of movement of the unit on the rule and movable longitudinally of the rule in the transverse diagonal movement of said member with respect to said unit.

5. In slide rules of the character described, an indicator unit mounted on and movable longitudinally of the rule, a member mounted in said unit for movement transversely thereof diagonally with respect to the path of movement of the unit on the rule, said member having a hair-line mark movable longitudinally of the rule in the transverse diagonal movement of said member with respect to said unit, another mark on said member movable transversely of the rule in the transverse movement of said member, and a scale on said unit with which said last named mark registers gauging the transverse movement of said member and the longitudinal movement of said hair-line mark in said unit.

6. An indicator for slide rules of the class described, said indicator comprising a frame mounted on and movable longitudinally with respect to the slide rule, a member movable diagonally in the plane transverse to the movement of said indicator on the rule, said indicator frame having a plurality of transversely spaced fixed markings thereon, said member having a hair line movable longitudinally of the indicator in the transverse movement of said member therein, and another marking on said member registering with the fixed markings of said indicator in measuring the degree of longitudinal movement of said hair-line marking with respect to said indicator.

7. In slide rules of the character described, an indicator unit mounted on and movable longitudinally of the rule, a member mounted in said unit for movement transversely thereof diagonally with respect to the path of movement of the unit on the rule, said member having a hair line mark movable longitudinally of the rule in the transverse diagonal movement of said member with respect to the rule, and another mark on said member movable transversely of the rule and co-acting with markings arranged transversely with respect to said rule for gaging the transverse movement of said member and the corresponding longitudinal movement to the hair line thereof.

8. In a slide rule having fixed and movable scales, an indicator having a hair-line element movable angularly to said scales for fractional readings of the scales, each scale having groups of transversely arranged markings, a mark on said hair-line element adapted to co-act with said last named markings in the angular movement of said element, and said groups of markings being spaced longitudinally of the scales.

9. A slide rule of the class described, comprising relatively slidable ruler parts each having longitudinally arranged scales, at least one of said ruler parts having transversely spaced markings said markings being arranged in groups varying in the transverse spacing thereof in proportion to the spacings of scale markings on said ruler parts.

10. A slide rule of the class described, comprising relatively slidable ruler parts each having longitudinally arranged scales, at least one of said ruler parts having transversely spaced markings, said markings being arranged in groups spaced longitudinally of said part, the markings of successive groups varying in the transverse spacing thereof in proportion to the spacings of scale markings on said ruler part, and the markings in each group being stepped diagonally with respect to opposed edges of the ruler part.

11. In a computing instrument having a scale including small subdivisions, an indicator mounted on and movable relatively to said scale, angularly movable means supporting a hair-line marking in said indicator, movement of said means relatively to said indicator providing greatly reduced movement of said hair-line with respect to said scale, and means for measuring the degree of movement of the hair-line between successive sub-divisions of the scale.

12. In a computing instrument having a scale including small subdivisions, an indicator mounted on and movable relatively to said scale, angularly movable means supporting a hair-line marking in said indicator, movement of said means relatively to said indicator providing greatly reduced movement of said hair-line with respect to said scale, means for measuring the degree of movement of the hair-line between successive sub-divisions of the scale, said last named means comprising a mark on said first named means and a plurality of markings spaced longitudinally with respect to the movement of said first named means.

13. In a computing instrument having fixed and movable scales, an indicator mounted on and movable relatively to said scales, a member on said indicator mounted for diagonal movement with respect to the path of movement of the indicator on the scales, said member having a marking arranged transversely of the scales, and the diagonal movement of said member providing greatly reduced movement of said marker longitudinally of the scales, thereby facilitating accurate selective adjustment of said marking with respect to said scales.

THEODORE J. SETERA.